US007096030B2

(12) United States Patent
Huomo

(10) Patent No.: US 7,096,030 B2
(45) Date of Patent: Aug. 22, 2006

(54) SYSTEM AND METHOD FOR INITIATING LOCATION-DEPENDENT APPLICATIONS ON MOBILE DEVICES

(75) Inventor: Heikki Huomo, Espoo (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/186,243

(22) Filed: Jun. 28, 2002

(65) Prior Publication Data

US 2004/0203863 A1  Oct. 14, 2004

(51) Int. Cl.
H04Q 7/20 (2006.01)
(52) U.S. Cl. .............................. 455/456.3; 455/412.1; 455/414.2; 455/550.1
(58) Field of Classification Search ............ 455/414.1, 455/414.2, 414.3, 418, 419, 456.2, 456.1, 455/456.3, 456.5, 550.1, 556.2, 566, 90, 455/412.1, 422.1; 701/208, 211, 213; 342/357.13, 342/357.09
See application file for complete search history.

(56) References Cited

U.S. PATENT DOCUMENTS

| | | | |
|---|---|---|---|
| 5,475,863 A | 12/1995 | Simpson et al. | |
| 5,613,205 A | 3/1997 | Dufour | |
| 6,198,927 B1 | 3/2001 | Wright et al. | |
| 6,199,045 B1 * | 3/2001 | Giniger et al. ................. 705/1 |
| 6,202,023 B1 | 3/2001 | Hancock et al. | |
| 6,351,221 B1 * | 2/2002 | Phillips et al. ......... 340/825.49 |
| 6,351,647 B1 | 2/2002 | Gustafsson | |
| 6,529,159 B1 * | 3/2003 | Fan et al. .............. 342/357.09 |
| 6,559,800 B1 | 5/2003 | Rabinowitz et al. | |
| 6,628,942 B1 | 9/2003 | Beming et al. | |
| 2003/0040340 A1 * | 2/2003 | Smethers .................... 455/566 |

FOREIGN PATENT DOCUMENTS

| WO | WO-00/51365 | 8/2000 |
|---|---|---|
| WO | WO-01/52572 A1 | 7/2001 |
| WO | WO-02/17117 A2 | 2/2002 |

* cited by examiner

*Primary Examiner*—Edward F. Urban
*Assistant Examiner*—John J. Lee
(74) *Attorney, Agent, or Firm*—Hollingsworth & Funk, LLC

(57) ABSTRACT

A system, apparatus, and method for facilitating location-based triggering of actions, applications, services, and the like on wireless devices, for locations that may be subsequently visited by the mobile device user. Wireless service area identifiers are received at the wireless device, where selected ones can be stored as points of interest on the wireless device. Actions are correlated with the stored points of interest, where this correlation is also stored on the wireless device. An action associated with a particular stored point of interest is invoked when the wireless device enters a wireless service area corresponding to the particular stored point of interest.

44 Claims, 10 Drawing Sheets

SYSTEM AND METHOD FOR INITIATING LOCATION-DEPENDENT APPLICATIONS ON MOBILE DEVICES

FIELD OF THE INVENTION

This invention relates in general to mobile communications, and more particularly to a system, apparatus, and method for facilitating location-based triggering of actions, applications, services, and the like on wireless devices, for locations that may be subsequently visited by the mobile device user.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

However, some applications or services that might be available for use on a mobile device may be of little value, until the user is placed in a particular context or location in which such applications and/or services may be very useful. This has led to a concept generally referred to as location-based services. Generally, existing location-based services have been directed to a situation where a person who is unfamiliar with his/her present surroundings can obtain location information from the wireless network, and then browse for certain information or services in that location. For example, a tourist may be in an unfamiliar city, and may be looking for the nearest one of her favorite franchise restaurants. With her consent, the network can measure her current location. Once her location information has been obtained at the network, she can be notified of her location by the network, thereby allowing her to search/browse for services around that location. Alternatively, after the network has determined the user's location, a network-resident program may be initiated to find services or information in that location. However, such an approach is complex and difficult to scale to large numbers of users and network traffic for frequent location determinations.

Another approach is to measure the position of the user with the assistance of the cellular network (e.g., Enhanced Observed Time Difference; EOTD), or with totally handset-based methods such as Global Positioning System (GPS) technology. Network-assisted methods would require that the terminal requests location data frequently, causing a great burden to the location infrastructure. Similarly, the use of GPS would undesirably increase the handset power consumption for these frequent location updates.

Further, these systems are directed to situations where the user is unfamiliar with his/her surroundings. However, it is more often the case that mobile terminal users are in a location in which they are familiar, and in fact they may frequent such locations on a regular basis. The prior art methods do not address this situation, and instead address the situation where the mobile terminal users need help because they are unfamiliar with their current surroundings. There is a need to provide location-based service and application triggering for users who may return to a location, without imposing heavy burdens on the network infrastructure. The present invention fulfills these and other needs, and offers other advantages over the prior art.

SUMMARY OF THE INVENTION

The present invention is directed to a system, apparatus, and method for facilitating location-based triggering of actions, applications, services, and the like on wireless devices, for locations that may be subsequently visited by the mobile device user.

In accordance with one embodiment of the invention, a method is provided for automatically initiating actions on wireless devices. The method includes receiving wireless service area identifiers at the wireless device, and storing one or more of the received wireless service area identifiers as points of interest on the wireless device. Actions are associated with one or more of the stored points of interest. An action associated with a particular one of the stored points of interest is invoked when the wireless device enters a wireless service area corresponding to the particular stored point of interest.

Further, in a more particular embodiment, additional personal parameters may be defined such that certain modes employing these personal parameters may be selected by the mobile device user depending on the particular circumstances in which the mobile user is using the device. For example, when the user is alone, a first mode employing personal parameters interesting mainly to the user himself/herself may be selected, such that when the device comes within a stored point of interest a first set of actions will be triggered (e.g., presenting a message relating to user's favorite nearby restaurant, initiating programs and/or providing a URL to sporting goods where the user is personally interested in sporting goods, etc.). When the user is with his/her spouse and children, another mode employing personal parameters interesting to the entire family may be selected, such that when the device comes within a stored point of interest a second set of actions will be triggered (e.g., presenting a message relating to a nearby kid-friendly restaurant, initiating programs and/or providing a URL to a toy store where the children may want to visit such a store, etc.). Such modes may be manually selected by the user, or may be automatically selected in accordance with predefined profiles based on, for example, the date, time of day, holidays, weekends, etc.

In more particular embodiments of such a method, the wireless service area identifier of the entered wireless service area is compared with the stored points of interest. This comparison is performed to determine whether the wireless service area identifier corresponds to the particular stored point of interest. In another particular embodiment, additional actions associated with respective ones of the stored points of interest are invoked each time the wireless device enters a wireless service area corresponding to one of the stored points of interest.

In accordance with other more particular embodiments, receiving wireless service area identifiers includes receiving base station identifiers in a cellular network. These base station identifiers may include, for example, a cell identifier that uniquely identifies the wireless service area with respect to other cells in a surrounding area. In the case of a GSM cellular network, the base station identifiers may be one or more of cell identifier (cell-ID) and/or a Base station Color Code (BCC). These identifiers may be received by the user of the wireless device by being physically present in the cell corresponding to the identifier, or by receiving a list of base stations provided as a paging area in connection with a mobile-assisted or mobile-based handover, or by receiving the identifier from a business or other mobile user, etc. In still other more particular embodiments, the wireless service may be a short-range wireless service, such as Bluetooth, Wireless Local Area Network (WLAN), etc., where the identifier is provided by an access point serving that wireless service area. The present invention is applicable where such short-range wireless service is the primary wireless service used in connection with the invention, or it may be used as a secondary, more precise location-based service in addition to a larger wireless service such as a cellular network.

In accordance with another aspect of the invention, a mobile terminal that is operable in a wireless network is provided. The mobile terminal includes a memory for storing a point of interest list, and an action list that correlates actions with various point of interest in the point of interest list. A processor is coupled to the memory to store wireless service area identifiers received at the mobile terminal as the points of interest in the point of interest list. The processor is configured to invoke an action pre-assigned via the action list to a particular one of the points of interest, when the mobile terminal is within a wireless service area corresponding to the particular stored point of interest. The mobile terminal includes a user interface for presenting the invoked action to a user of the mobile terminal.

In accordance with another embodiment of the invention, a system is provided for facilitating automatic initiation of actions on mobile terminals. The system includes a cellular network having a plurality of cells each substantially defined by a wireless transmission range of a corresponding base station. Each of the cells is identifiable by a cell identifier (cell-ID) that is transmitted via its respective base station. The system further includes at least one mobile terminal operable in the cellular network and capable of performing mobile-assisted handovers. The mobile terminal includes a memory, which in turn includes a point of interest list, an action list correlating one or more actions with each point of interest in the point of interest list, and a list of cell-IDs provided by a base station of the cell in which the mobile terminal is physically located. The list of cell-IDs corresponds to a plurality of candidate channels for mobile-assisted handovers supplied by the base station. The mobile terminal further includes a processor coupled to the memory to store one or more cell-IDs, selected from the list of cell-IDs, as the points of interest in the point of interest list. The processor is configured to invoke an action pre-assigned via the action list to a particular one of the points of interest, when the mobile terminal is within a cell corresponding to the particular stored point of interest.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to context-based triggering of actions, applications, services, etc. on wireless devices. Depending on the context or location in which a mobile device is being used, particular actions are automatically carried out. In accordance with the present invention, these actions are triggered at the mobile device itself when the mobile device is in an area that is currently determined to be, or has previously been "tagged" as, a point of interest. Points of interest are tagged by storing a radio frequency identifier corresponding to that particular wireless area. When the mobile terminal moves from place to place and recognizes that it is within a wireless area corresponding to a stored point of interest, the mobile device automatically initiates an action that has been linked to the corresponding radio frequency identifier for that wireless area. In this manner, actions, applications, services, etc. can be automatically initiated at the mobile device, without the need for network-based location services or network-based service triggering. The invention is particularly beneficial for mobile terminal users who expect to return (whether frequently or infrequently) to one or more particular locations, as the mobile terminal itself will recognize that it has returned to such a location and can automatically trigger actions, applications, services, etc. that are useful at that location.

Figure 1:
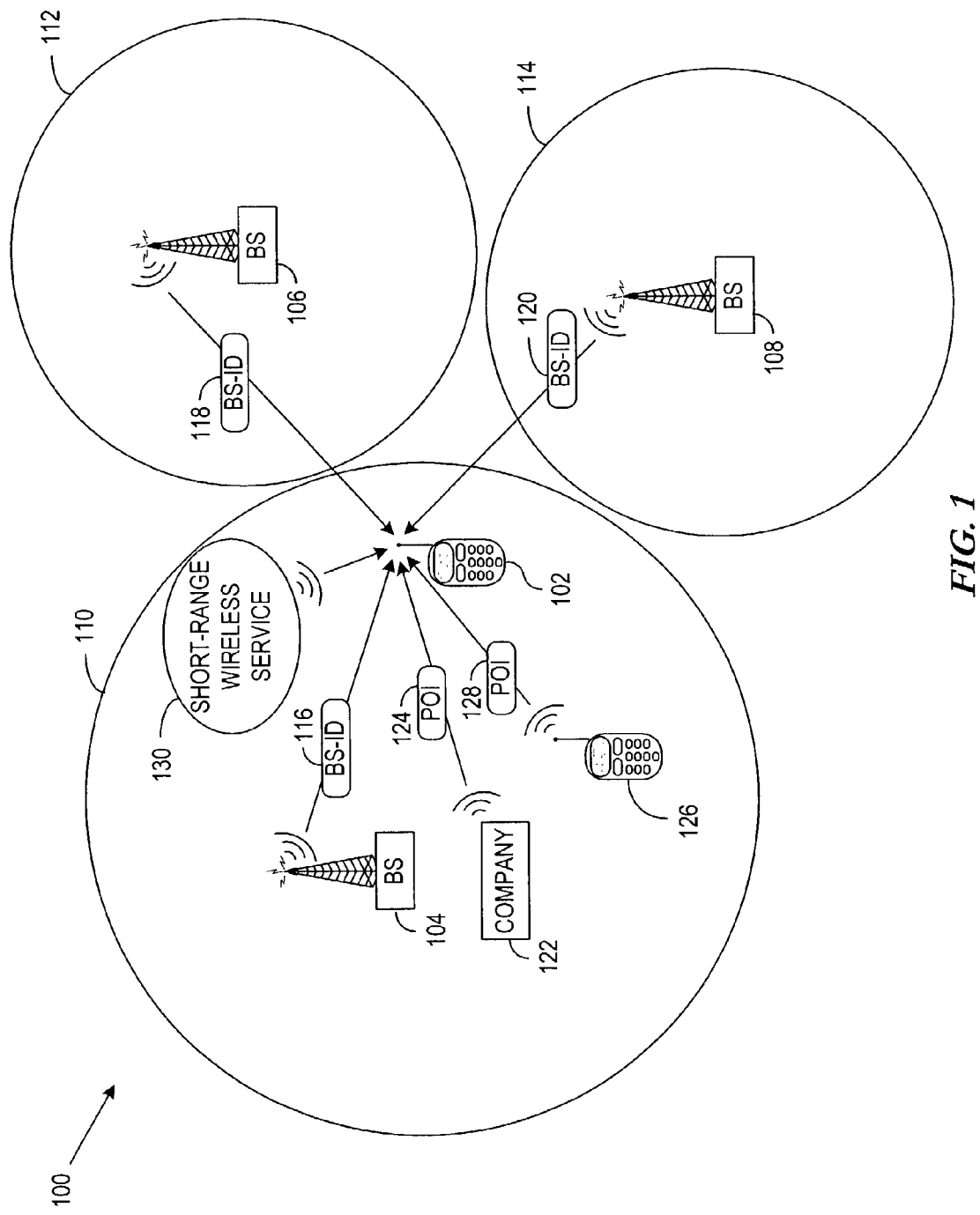
FIG. 1 is a block diagram generally illustrating a number of representative examples in which a mobile terminal can receive radio frequency identifiers that can tagged as a Point of Interest (POI) in accordance with the invention.

In accordance with the present invention, points of interest (POI) can be captured or "tagged" for current and subsequent triggering of actions, applications, services, etc. (hereinafter generally referred to as "applications"). FIG. 1 is a block diagram generally illustrating a number of representative examples in which a mobile terminal can receive radio frequency identifiers that can ultimately be tagged as a Point of Interest (POI) in accordance with the invention. The examples set forth in FIG. 1 are provided as representative examples to facilitate an understanding of this aspect of the present invention, however it should be recognized that the present invention is not limited to these representative examples.

FIG. 1 depicts a wireless network environment 100, which may include a cellular network such as the Global System for Mobile Communication (GSM). A portion of the description provided in connection with FIG. 1 is described in terms of a cellular network such as GSM, but the principles described herein are equally applicable to other cellular/wireless networks such as, for example, Enhanced Data rate for GSM Evolution (EDGE), Personal Communications Service (PCS), and other current or future cellular network technologies. For purposes of discussion and not of limitation, FIG. 1 will be described in terms of a GSM system.

In a mobile radio network such as a GSM network, the area to be covered is divided into multiple areas, generally referred to as "cells." The mobile radio network is assigned a set of frequencies, and each cell is assigned one (or more) of these frequencies. Neighboring cells will not use the same frequencies, and frequencies are re-used only where the distance is sufficiently large as to avoid interference. When a mobile terminal moves from one cell to another, an automatic channel/frequency change will occur, which is generally referred to as "handoff" or "handover." There are different manners in which such handover may be realized, such as network-based handover, mobile-based handover, and mobile-assisted handover. At least some of these concepts will be described more fully below.

In general, a GSM network includes a number of primary subsystems, including a radio subsystem (RSS), a switching subsystem (SS), and an operation subsystem (OSS). The SS connects the wireless network with other networks such as standard public networks, performs handovers between different Base Station Subsystems (BSSs), includes worldwide user location functions, and supports charging, billing, and roaming of users between different service providers. The SS includes elements such as a Mobile Services Switching Center (MSC), a Home Location Register (HLR), Visitor Location Register (VLR), and other elements known in the art. The OSS provides functions for network operation and maintenance, and includes elements such as an Operation and Maintenance Center (OMC), Authentication Center (AuC), Equipment Identity Register (EIR), and other elements known in the art. The SS and OSS, being known in the art and not of particular relevance to the instant discussion, need not be described in further detail.

The RSS includes radio-specific elements, such as the mobile terminals and the Base Station Subsystem (BSS). Referring to FIG. 1, a mobile terminal 102 includes the hardware, software, Subscriber Identity Module (SIM), etc. necessary to communicate with the GSM network. The GSM network includes multiple BSSs, each of which is controlled by a Base Station Controller (BSC). The BSS is responsible for maintaining radio connections to the mobile terminals, coding and decoding, etc. The BSS is a logical entity physically implemented via the BSC and a set of Base Transceiver Stations (BTS), commonly referred to simply as Base Stations (BS), that are controlled by the BSC. In FIG. 1, three of the many available base stations are illustrated, including BS 104, 106, 108. Each BS includes the radio equipment, such as antennas, signal processing, amplifiers, etc. used to facilitate the communication between the BSC and the mobile terminals. The wireless area served by a BS is generally referred to as a cell, such that cell 110 is served by BS 104, cell 112 is served by BS 104, and cell 114 is served by BS 108.

In a cellular network such as the exemplary GSM network portion illustrated in FIG. 1, a number of identifiers are used to identify the various network constituents. For example, the mobile terminals 102 are generally associated with an equipment identifier, and the user of the mobile terminal 102 is generally associated with a subscriber identifier (such as that provided by a SIM) as well as with an identifier such as a telephone number. In addition, several other identifiers are defined for managing subscriber mobility and addressing other network elements.

Among these other identifiers are the cell identifier (cell-ID) and the Base Transceiver Station Identity Code (BSIC). To understand these identifiers, it is noted that a GSM network includes various geographic areas, including cells, Location Areas (LAs), MSC/NVLR service areas, and Public Land Mobile Network (PLMN) areas. As previously indicated, a cell is the area generally corresponding to a BS radio coverage area, and is identified via the cell-ID. The LA is a group of cells, and corresponds to the area in which subscribers are paged, where paging refers to the act of broadcasting over the setup channel in order to locate a mobile terminal. Each LA is served by one or more BSCs and by a single MSC. Each LA is assigned a location area identity (LAI) number.

Within a particular LA, the individual cells are uniquely identified with a cell-ID. Together with the LAI, cells can be uniquely defined on an international level. As to the BSIC, a unique BSIC is used in order to distinguish neighboring base stations. For example, the BSIC includes a color code within a PLMN referred to as the Network Color Code (NCC), and a Base station Color Code (BCC). The purpose of the color codes is to provide a manner for the mobile terminal to distinguish between two different cells using the same radio transmission frequency. Within the same network, the identification can be performed using the BCC, where overlapping networks further utilize the NCC. The BSIC is broadcast periodically by the base station on the Synchronization Channel (SCH).

Returning to FIG. 1, one embodiment of the invention involves receiving one or more cell-related identifiers at the mobile terminal 102, which can then be used by the mobile terminal 102 to trigger the desired application. For example, in one embodiment of the invention, handovers are effected using mobile-based handover and/or mobile-assisted handover (MAHO) principles. As is known in the art, MAHO is a feature that allows the mobile terminal to play a role in determining when a handoff occurs, and in some cases, which cell the call is handed to. MAHO is therefore a decentralized call processing methodology where signal strength measurements performed at the mobile terminal are used to make or assist in handover decisions. The mobile terminal performs signal strength measurements (and bit error rate measurements) on the received signal on the channel is it currently operating on, as well as signal strength measurements on a list of candidate channels supplied to it by the BS.

For example, the mobile terminal 102 can perform signal strength measurements for the channel associated with BS 104, as well as other base stations such as BS 106, 108. In this manner, the mobile terminal 102 creates and maintains a list of current base stations that are in range, for purposes of mobile-based and mobile-assisted handover and call initiation. More particularly, mobile terminal 102 will receive a unique base station identifier 116, such as the cell-ID and/or BSIC, from BS 104, as well as such identifiers 118, 120 from other base stations 106, 108 respectively. This information can be used by a mobile terminal-specific implementation to identify or "tag" the area served by one or more of the list of base stations as Points of Interest (POI). One or more actions, applications, services, etc. may then be linked to each POI. As described more fully below, a user's re-entry into an area/cell 110, 112, 114 where a POI has been stored can automatically invoke an application(s) or other action(s) in accordance with the invention.

In accordance with another embodiment of the invention, other users or entities may provide base station identifiers, i.e., potential POIs, to the mobile terminal 102 user. For example, an entity such as a retail store or other company 122 may transmit a potential POI 124 to prompt the user of the mobile terminal 102 to consider accessing and/or storing that location identifier for current and/or future use. The potential POI 124 essentially includes a predetermined base station identifier and/or cell-ID that is measured and provided by the company 122, possibly with the assistance of the cell operator or a third party that is knowledgeable on how to measure the appropriate signals. If the user stores the POI 124, an action linked to that POI 124 will automatically be triggered when the user returns to cell 110.

The type of information that can be provided by such an entity 122 can vary widely. For example, the company 122 can provide the POI 124, and can also provide a message, application link, etc. if the user chooses to make use of the POI 124. Messages and applications may be for any purposes, such as notifying the user of a company sale, providing electronic coupons, providing directions or company contact information, information related to a frequent buyer program, etc. In a more particular embodiment, the message or action associated with the POI 124 may be a list of base station identifiers corresponding to different franchise locations of that company 122. Thus, if the company is a favorite or frequently visited company of the mobile terminal 102 user, the user can tag one, more, or all of the base station identifiers for the various franchise locations of this company. When the user enters any of these locations, an action can be invoked, such as notifying the user that he/she is currently within a certain distance of one of the company franchises, notifying the user of the address or directions to the franchise, sale notices, provide electronic coupons, etc.

In another embodiment, other mobile terminal 126 users can similarly transfer POIs 128 to the mobile terminal 102 user. A user of mobile terminal 126 can, for example, transfer one or more stored POIs 128 to the user of mobile terminal 102 for storage therein. When the mobile terminal 126 then enters a cell/area corresponding to that POI(s) 128, the corresponding action will automatically be invoked. Each user may modify his/her particular action to be performed upon recognition of the particular POI. For example, the possessor of POI 128 may have stored the POI of a cell area corresponding to a train or subway station, and the application invoked is to determine the schedule for a "red" rail line. Upon receiving a transferred copy of the POI 128, the user of mobile terminal 102 can modify the action corresponding to that POI 128 to invoke an application to determine the schedule for a "blue" rail line. This simple example merely exemplifies that users can modify the particular actions associated with a stored POI.

The principles described herein are also applicable to smaller-scale wireless services. For example, each of the areas 110, 112, 114, etc. may correspond to short-range wireless services, such as Wireless Local Area Networks (WLAN), Bluetooth, or other radio technologies. Bluetooth, for example, is a computing and telecommunications industry specification that describes how mobile phones and other mobile terminals can interconnect with each other and with home and business phones/computers using a short-range wireless connection. A Bluetooth hot spot is an area that has a readily accessible wireless network available to multiple people within that area. The Bluetooth hot spot is thus a location such that when a device equipped with Bluetooth circuitry is within range of a Bluetooth "access point," the user can connect wirelessly to the access point to gain connectivity to a wireless or landline network. Thus, in another embodiment of the invention, the areas 110, 112, 114 may represent the range of Bluetooth transmissions, where the base stations 104, 106, 108 would represent Bluetooth access points.

Further, the present invention is applicable to multiple technologies where a greater degree of accuracy is desired. In the cellular network context, the accuracy of the identified location substantially corresponds to the size of the cell. A user may tag multiple POIs within any particular cell, which would automatically trigger a corresponding number of actions to be invoked when the user enters that cell. Further, cell sizes may be smaller and cells may be more densely grouped due in higher volume areas, and the mobile terminal may be able to receive signals from a number of different cells in the general area. Thus, when application triggering is based on cell location, it is possible that a plurality of applications may be triggered when the mobile terminal is in a particular cell. However, in some implementations, it may be desirable to further regulate which actions will be automatically invoked while in a particular cell, by further distinguishing subsections of a cell using a smaller scale wireless service such as Bluetooth, a WLAN, etc. For example, a short-range wireless service 130, e.g., Bluetooth, may be additionally used while the mobile terminal 102 is within cell 110, such that a stored action/application(s) is automatically invoked when the user is within the range of the short-range wireless service 130.

Figure 2:
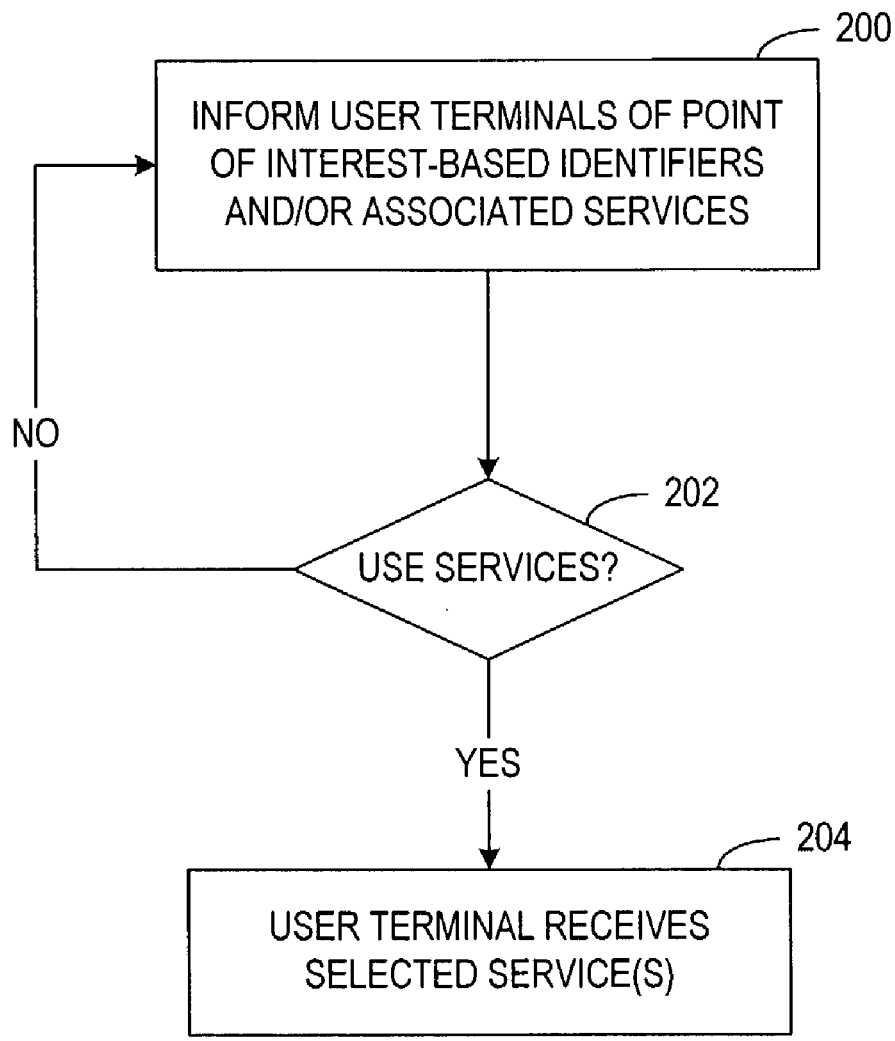
FIG. 2 is a flow diagram illustrating an exemplary manner in which a user is presented with information from which services may be accessed in accordance with the principles of the present invention.

FIG. 2 is a flow diagram illustrating an exemplary manner in which a user is presented with information from which a service(s) may be accessed in accordance with the principles of the present invention. The user terminals are informed 200 of POI-based identifiers, e.g., cell-ID, BSIC, or other identifier corresponding to the wireless area served by that POI. The user terminals may also be informed of associated services corresponding to that POI. For example, the user terminals may be informed of a POI-based identifier and a Java applet that will be run if the user chooses to use the service. If the user chooses to use the services as determined at decision block 202, the user terminal will receive 204 the selected services. In this manner, a retail store or other entity can present a mobile terminal user with an option of using a particular service(s). As described in greater detail below, the user can then store that POI-based identifier so that subsequent entry into the area corresponding to that POI-based identifier will again present the associated service(s).

Figure 3:
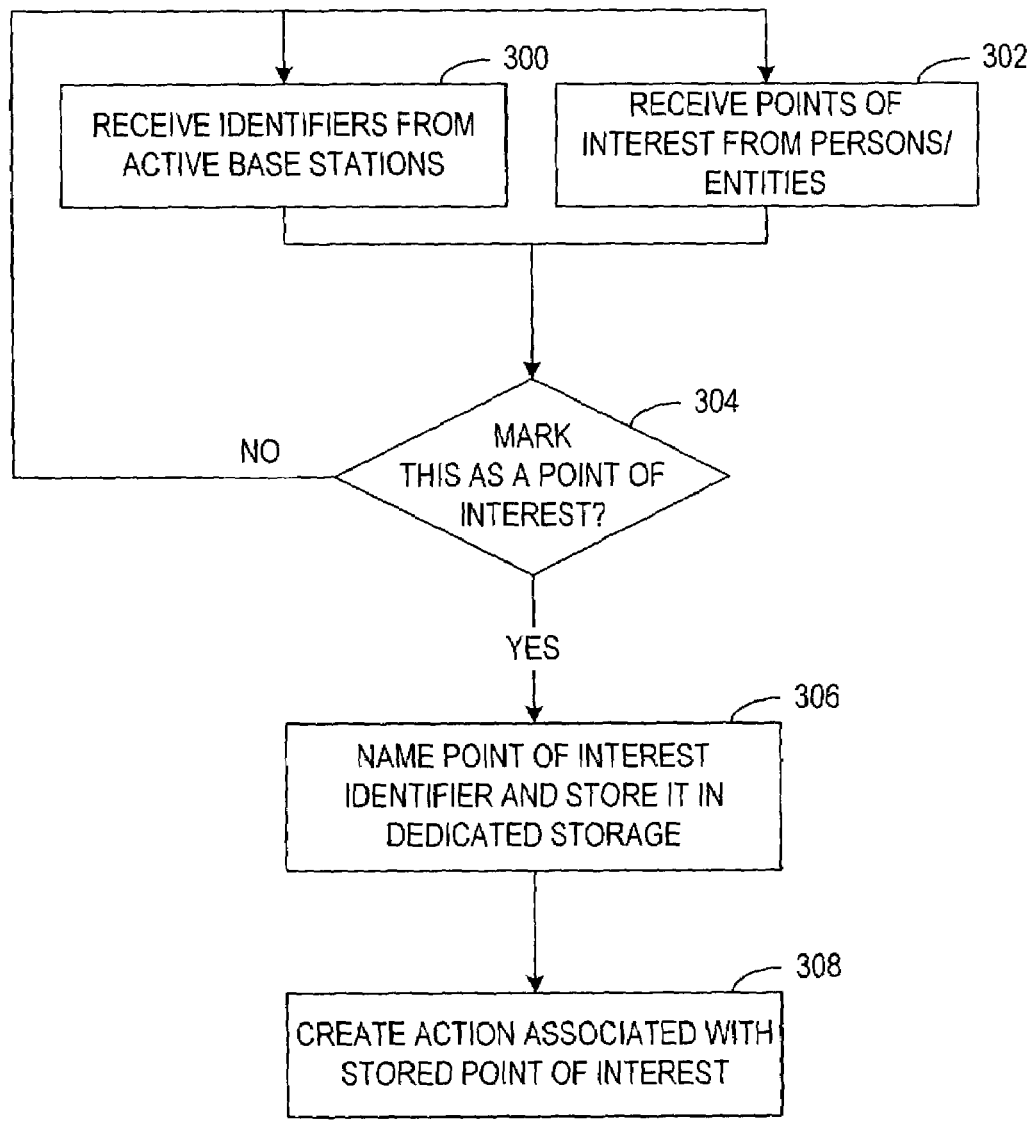
FIG. 3 is a flow diagram illustrating an exemplary embodiment of a manner in which a mobile terminal user can mark Points of Interest for subsequent use at substantially the same location.

FIG. 3 is a flow diagram illustrating an exemplary embodiment of a manner in which a mobile terminal user can mark one or more POIs for subsequent use at substantially the same location. A number of different manners in which the mobile terminal user may be made privy to the location identifiers. For example, the mobile terminal may receive 300 identifiers from a cellular network, such as a cell-ID, BSIC, etc. in a GSM network. In a mobile-based handover or mobile-assisted handover scenario, the mobile terminal will already have a number of such identifiers temporarily stored on the mobile terminal for purposes of facilitating handover and/or call initiation. Further, the mobile terminal may be picking up a plurality of base station signals, particularly where in a high volume area where cell size is typically smaller than where wireless traffic is lower.

Alternatively, a person or entity may measure the cell-ID or other base station identifier, and may provide this information as a POI to be received 302 at the mobile terminal. The mobile terminal user may decide whether or not to mark or tag this as a POI, as determined at decision block 304. If so, the POI can be named 306 by the user, and stored in local storage. The user can then create 308 an action associated with this stored POI, such as to send a message. Any message format available on the mobile terminal may be used, such as Short Messaging Service (SMS), Enhanced Messaging Service (EMS), Multimedia Messaging Service (MMS), etc. Or, a text or multimedia message may be locally presented on the mobile terminal display when the mobile terminal enters the area corresponding to the stored POI. Another action may be to invoke a local application, such as a currency converter, calculator, audible alarm, e-mail application, etc. Yet another action may be to open a local browser, such as a Wireless Application Protocol (WAP) browser, and to access a predetermined URL via the browser. The type of action that can be associated with a particular POI is virtually limitless.

As described above in connection with block 300, the mobile terminal may pick up a plurality of base station signals, particularly where in a high volume area where cell size is typically smaller than where wireless traffic is lower. In some instances, the cell-ID or other access point identifier provides accuracy substantially commensurate with the cell size. In such a case, the mobile terminal may only "hear" one identifier as there is only one cell signal that will be available within that geographic area. However, the local capacity need in today's cellular systems may need to be fulfilled by using very small cell sizes due to the high volume in a particular area or in neighboring areas. Such an example might be a downtown area where a high number of wireless services are being used at a given time. These cells are sometimes referred to as "microcells" or "picocells." These cells often overlap in space, and the mobile terminal may therefore receive or "hear" multiple cell-IDs or other access point identifiers at a given time. This may be referred to herein as a "radio fingerprint" which includes several cell-IDs, which will be perceived by the mobile terminal at potentially different relative field strengths. In such a case, the mobile terminal may store a predetermined number, or all, of the cell-IDs or other identifiers associated with the strongest field strengths. Actions can be triggered based at least in part on the relative field strengths of these multiple signals, the identifiers of which are all available within the mobile terminal. For example, the mobile terminal could invoke actions relating to any of the identifiers currently perceivable thereto. Alternatively, the mobile terminal could invoked actions relating to the strongest relative field strength, or to a predetermined number of the strongest relative field strengths. In this manner, a great deal of flexibility and accuracy may be realized in accordance with the present invention.

Figure 4:
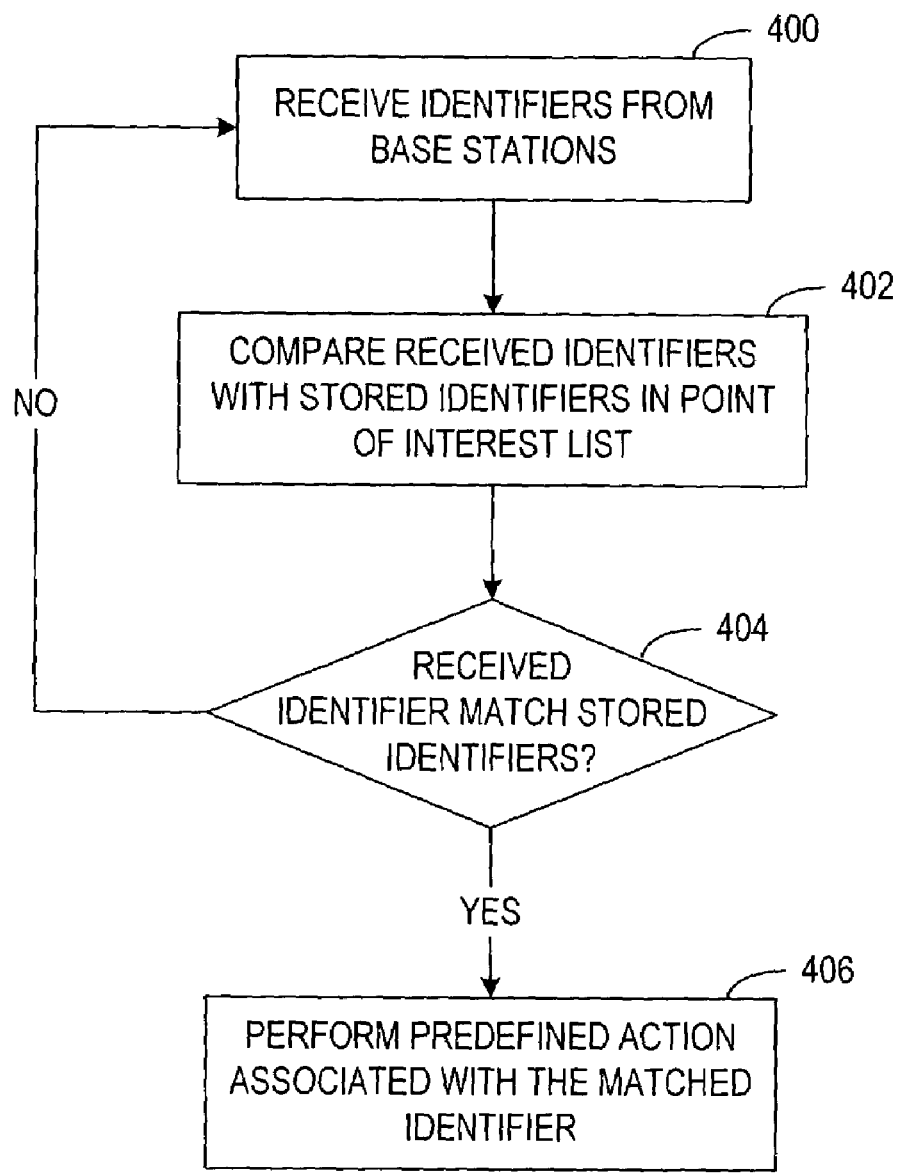
FIG. 4 is a flow diagram illustrating one manner in which stored Points of Interest execute predefined actions upon subsequent re-entry to the location corresponding to the Points of Interest.

FIG. 4 is a flow diagram illustrating one manner in which stored POIs execute predefined actions upon subsequent re-entry to the location corresponding to the POIs. Identifiers from base stations are received 400 at the mobile terminal when the mobile terminal is within a certain range of the base stations. Where a user has previously stored or "marked" one or more identifiers as POIs, the identifier(s) currently received at the mobile is compared 402 with the stored identifiers in the POI list. If the received identifier matches a stored identifier as determined at decision block 404, the predefined action associated with the matched identifier is performed 406.

In accordance with one embodiment of the invention, additional personal parameters may be defined such that certain modes employing these personal parameters may be selected by the mobile device user depending on the particular circumstances in which the mobile user is using the device. For example, when the user is alone, a first mode employing personal parameters interesting mainly to the user himself/herself may be selected, such that when the device comes within a stored point of interest a first set of actions will be triggered (e.g., presenting a message relating to user's favorite nearby restaurant, initiating programs and/or providing a URL to sporting goods where the user is personally interested in sporting goods, etc.). When the user is with his/her spouse and children, another mode employing personal parameters interesting to the entire family may be selected, such that when the device comes within a stored point of interest a second set of actions will be triggered (e.g., presenting a message relating to a nearby kid-friendly restaurant, initiating programs and/or providing a URL to a toy store where the children may want to visit such a store, etc.). Such modes may be manually selected by the user, or may be automatically selected in accordance with predefined profiles based on, for example, the date, time of day, holidays, weekends, etc.

Figure 5A:
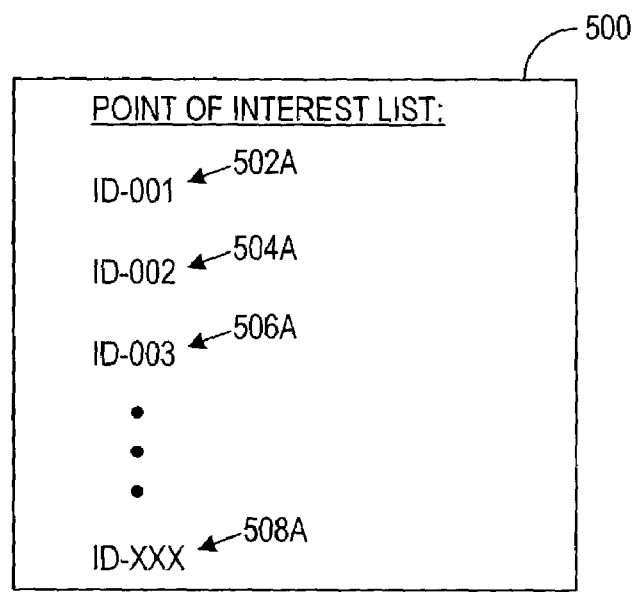
FIGS. 5A and 5B illustrate various information lists that may be locally stored at the mobile terminal in order to facilitate the automatic triggering of applications in accordance with the present invention.
Figure 5B:
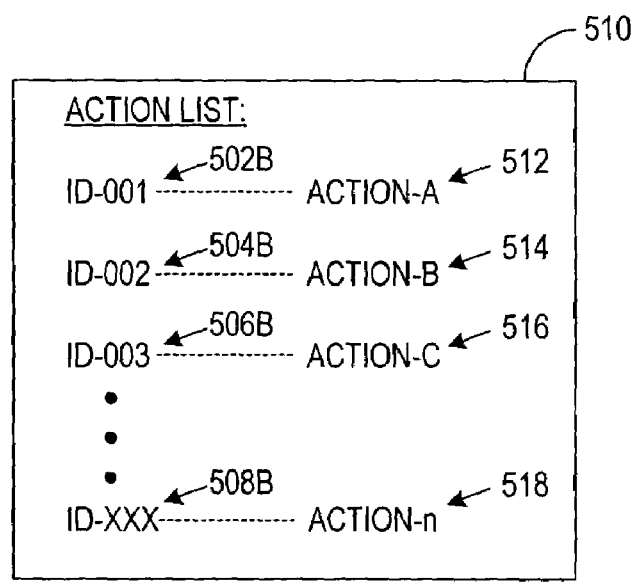

FIGS. 5A and 5B illustrate various information lists that may be locally stored at the mobile terminal in order to facilitate the automatic triggering of applications in accordance with the present invention. FIG. 5A illustrates an exemplary Point of Interest (POI) list 500. Such a list includes, for example, a list of cell-IDs of the base stations of POIs that are stored in the mobile terminal memory. For example, a first identifier shown as POI 502A represents a first stored POI. The base station identifier corresponding to this stored POI is shown as ID-001, although the actual value would correspond to the actual cell-ID or other identifier (e.g., BSIC) that is used to identify the location. Using a compare engine within the mobile terminal, this base station identifier will be compared to the base station identifier corresponding to the location that the user is currently in, or corresponding to closely surrounding locations in some cases such as where multiple base station identifiers can be sensed or in a MAHO embodiment where the base station provides the mobile terminal with a list of base station identifiers close to the mobile terminal. Any number of entries 504A, 506A, through 508A may be stored, depending on the mobile terminal memory allocated to such storage.

FIG. 5B illustrates an exemplary action list 510 in accordance with the present invention. The action list provides for a stored correlation between a stored POI in the POI list 500 and an action that is to be taken when the current base station identifier matches one of the POIs in the POI list 500. For example, if the current base station identifier matches stored POI ID-001 502A shown in FIG. 5A, then Action-A 512 will be executed. This is because Action-A 512 has been associated with ID-001 502B in advance (or at the time ID-001 502 is stored). Similarly, if the current base station identifier matches stored POI ID-002 504A of FIG. 5A, Action-B 514 will be executed. If it matches stored POI ID-003 506A of FIG. 5A, Action-C 516 will be executed, and so forth through Action-n 518 which is associated with ID-XXX 508B. It should be noted that the POI list 500 and the action list 510 may be integrated into one list, or may be separate. For example, the list of POIs 502B, 504B, 506B, 508B in the action list 510 may serve as the POI list 500 in one embodiment of the invention. It should also be recognized that the term "list" as used herein is used generically, and is not intended to cover any particular data structure. Rather, storage of the "list" of POIs and actions may be structured in any desired manner, such as in an array, table, linked-list, random locations, etc.

As previously indicated, the action to be performed may be any number of desired actions. For example, the action could be user-defined as a query for a bus/train/airline schedule. Or, the action could be a notification presented to the user when the user is in the vicinity of a good restaurant, where the action may include an audible indication in addition to a displayed textual or multimedia message indicating "Remember that ABC restaurant has delicious spring rolls" on the mobile terminal display. The action can also be provided by an organization, such as a retail store in a mall area. For example, the store can provide a local Java applet that could, for example, include audio and/or video to welcome the mobile terminal user to their actual store that is in the vicinity of the mobile terminal user's current location. Upon receipt of this externally-provided action, the user may decide whether or not to start the application. If the user starts the application, any number of actions can take place, such as offering a frequent buyer program registration to the user by opening a connection between the mobile terminal and the store. Alternatively, the mobile terminal may decide not to open such a connection, but rather stay in idle mode.

Figure 6:
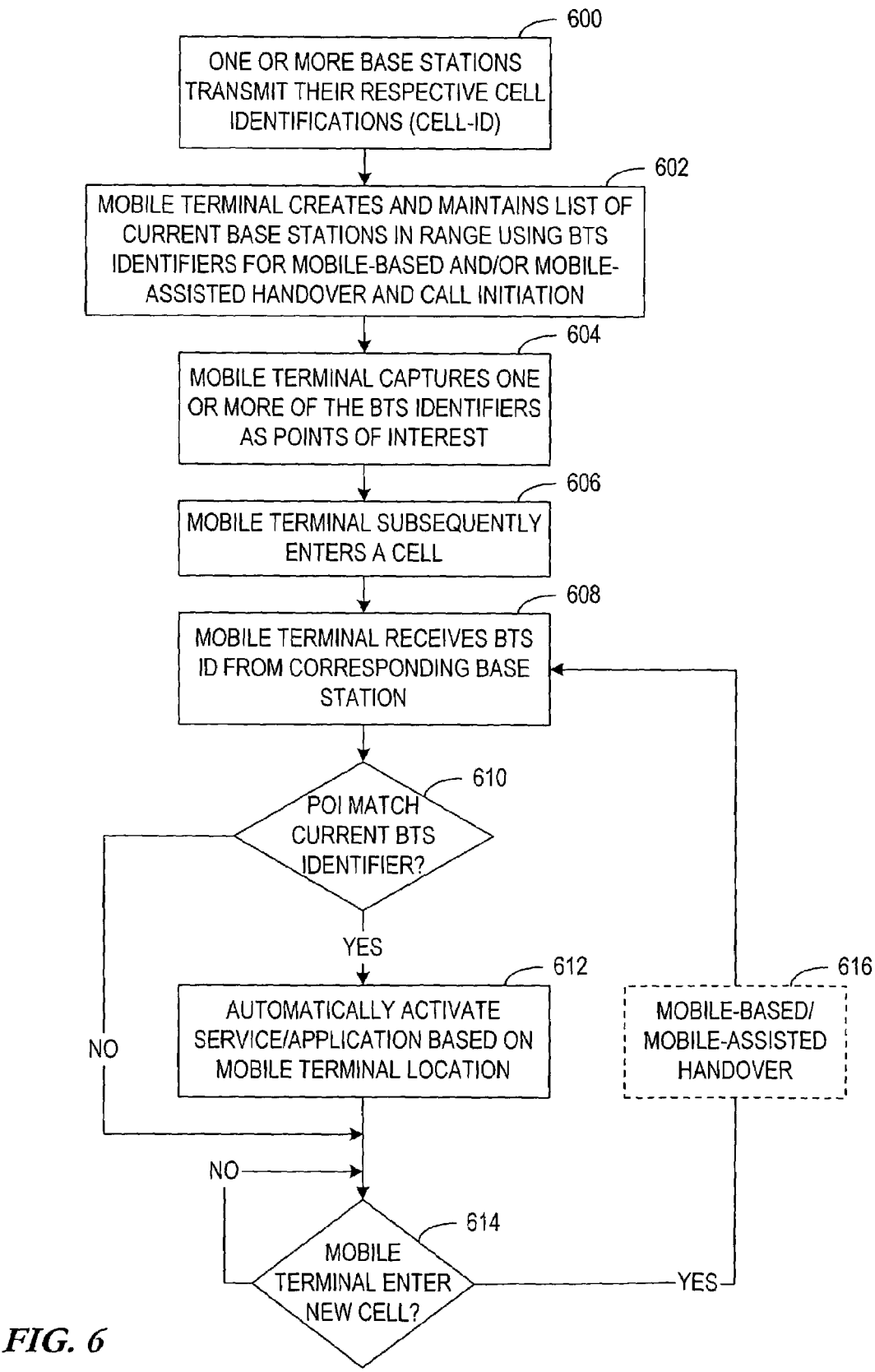
FIG. 6 is a flow diagram of an exemplary embodiment of a method for automatically triggering applications in a cellular network environment, where the cellular network environment includes a mobile-based and/or mobile-assisted handover feature.

As previously indicated, one manner in which a mobile terminal may be presented with base station IDs from which POIs may be selected is in the mobile-based and/or mobile-assisted handover environment. FIG. 6 is a flow diagram of an exemplary embodiment of a method for automatically triggering applications in a cellular network environment in accordance with the present invention, where the cellular network environment includes a mobile-based and/or mobile-assisted handover feature. One or more base stations transmit 600 their respective cell-IDs. As shown at block 602, the mobile terminal creates and maintains a list of current base stations in range using base station identifiers for mobile-based and/or mobile-assisted handover and call initiation. The mobile terminal captures 604 one or more of the base station identifiers as POIs.

When the mobile terminal subsequently enters 606 a cell, the mobile terminal receives 608 the base station identifier for that cell. It is determined 610 whether the current base station identifier(s) matches any of the POIs stored at the mobile terminal. If not, no immediate action is taken. If the current base station identifier does match a POI in the POI list, the service, application, or other action associated with that POI is automatically activated 612 at the mobile terminal. If the user enters yet another cell as determined at decision block 614, the process is repeated in that the mobile terminal will receive 608 a base station identifier from the corresponding base station. Further, in the mobile-based/mobile-assisted handover scenario, such a handover may be effected, as depicted by block 616.

Figure 7:
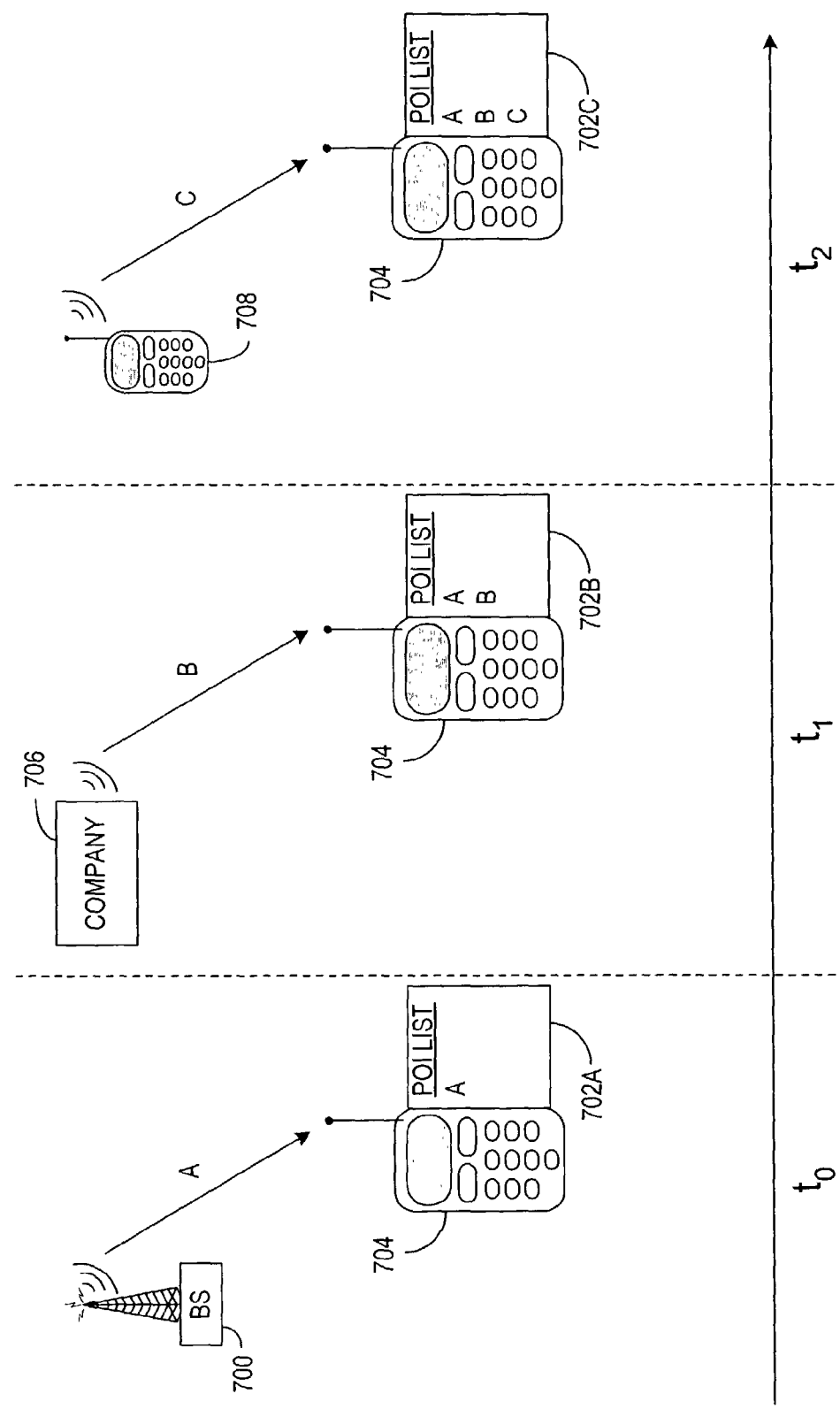
FIG. 7 is a block diagram illustrating exemplary manners in which a mobile terminal user receives radio frequency identifiers and creates a Point of Interest list.

FIG. 7 is a block diagram illustrating exemplary manners in which a mobile terminal user receives radio frequency identifiers (e.g., base station identifiers) and creates a Point of Interest list. At a first time, to, the mobile terminal user is within a cellular network cell, and receives an identifier "A" from a base station 700. Upon receipt, the identifier A can be stored in the POI list 702A of the mobile terminal 704. The user may then travel to a new location at time $t_1$, at which time a company 706, such as a retail store, provides a radio frequency identifier "B" to the mobile terminal 704. The user may again choose to store this POI in the POI list 702B. At this time, the POI list 702B includes both identifiers A and B, such that a subsequent entry into an area corresponding to identifiers A or B will automatically perform the action associated with the particular identifier. As yet another example, the user may at any time (e.g., $t_2$) receive an identifier C from another mobile terminal 708, such as from a friend, relative, co-worker, etc. who has already stored this identifier C as part of their POI list. If the mobile terminal 704 user decides to accept this identifier C, it will be stored in the POI list 702C. When the user later enters the cell or other area corresponding to identifier C, it will be recognized as part of the POI list 702C, and an associated action will automatically be performed.

Figure 8:
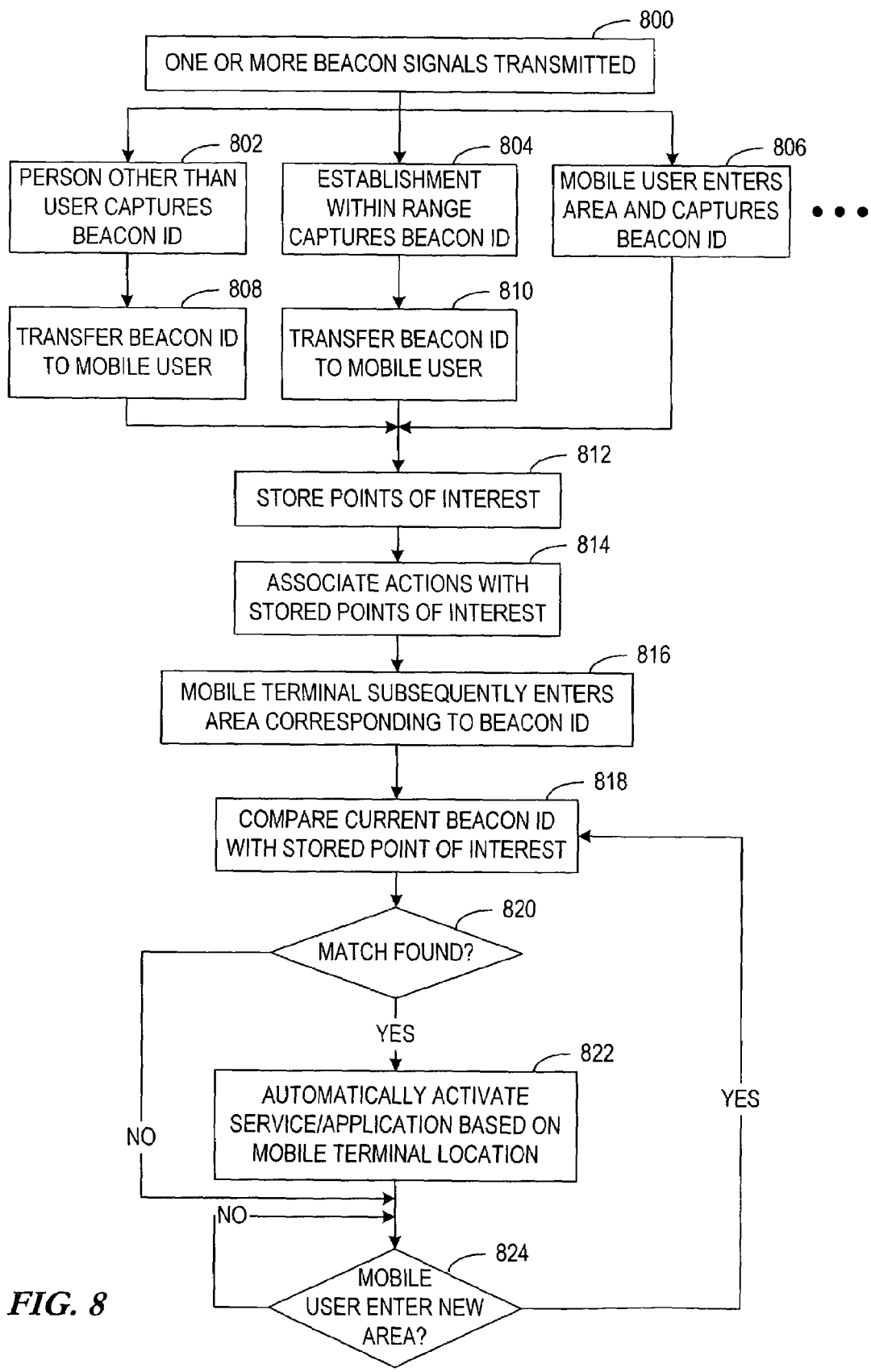
FIG. 8 is a flow diagram illustrating exemplary manners in which a mobile terminal user receives beacon signal identifiers which can be stored as Points of Interest, and whereby predefined actions corresponding to the Points of Interest are executed upon re-entry to the location corresponding to the Points of Interest.

FIG. 8 is a flow diagram illustrating exemplary manners in which a mobile terminal user receives beacon signal IDs which can be stored as POIs, and whereby predefined actions corresponding to the POIs are executed upon re-entry to the location corresponding to the POIs. In this embodiment, one or more beacon signals are transmitted 800 by various wireless services. The beacon signals generically represent identifiers such as BS identifiers in a GSM or other cellular network, a Bluetooth or other short-range wireless service identifier, and the like. The beacon signals provide at least an identifier that properly identifies the transmitted signal, so that it can stored as a POI and later identified. These beacon signals can be provided by another mobile terminal user or establishment, as shown at blocks 802, 804 respectively. The beacon IDs may be transferred 808, 810 to the mobile user. Alternatively, the mobile user himself/herself may enter an area and capture the beacon ID, as depicted at block 806.

The mobile terminal user optionally stores 812 the beacon ID as a POI, and associates 814 actions with the stored POIs. After the beacon ID has been stored as a POI, the mobile terminal user may subsequently enter 816 an area that is transmitting a beacon ID. The currently-received beacon ID is compared 818 to the stored POIs, and if a match if found as determined at decision block 820, an application or other predefined action is automatically activated 822 at the mobile terminal. When the mobile terminal user enters new areas as determined at decision block 824, the beacon ID at the new location is again compared 816 to the stored POI list, and the process continues.

Figure 9:
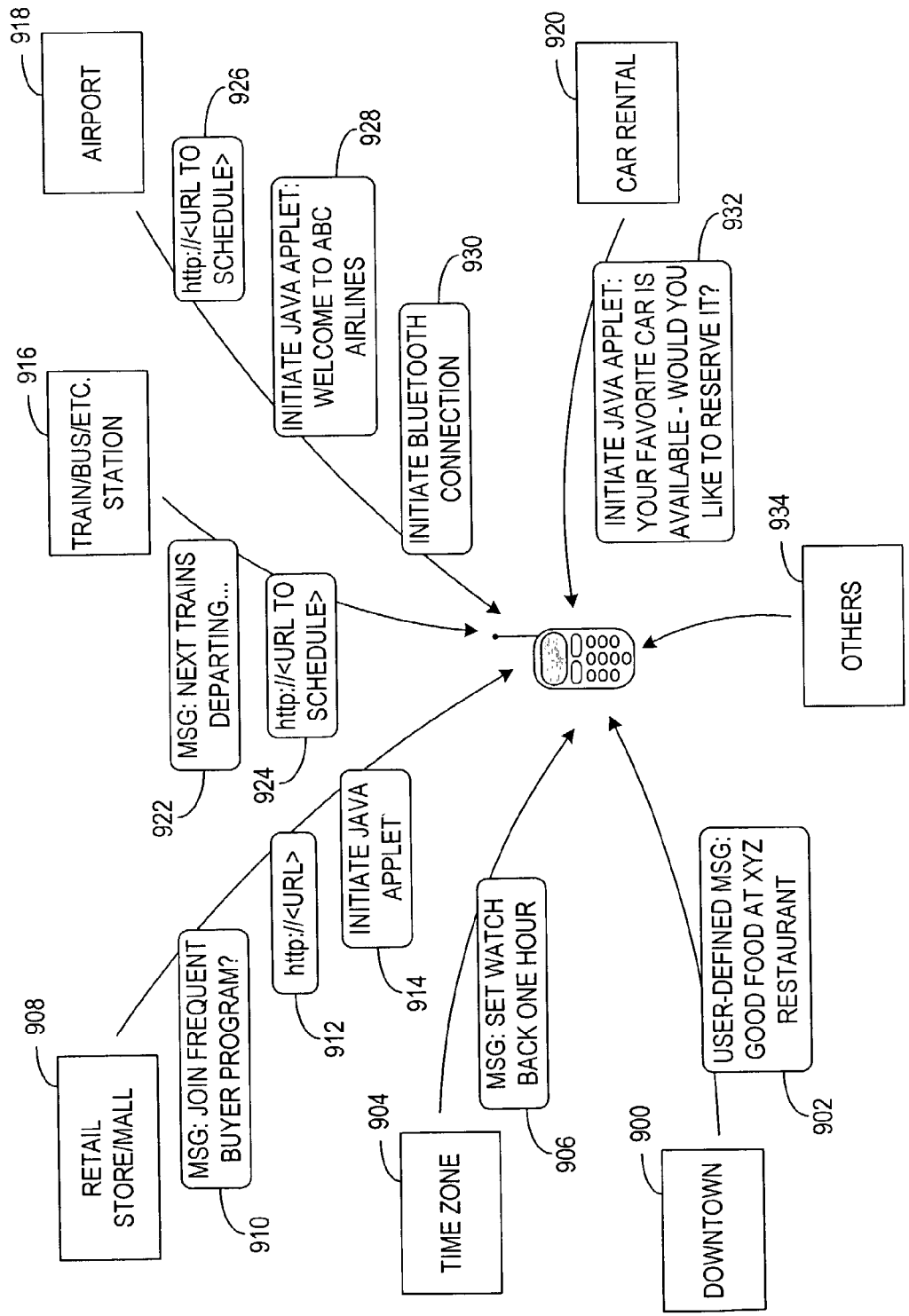
FIG. 9 is a block diagram illustrating a number of representative locations and corresponding actions that can be associated with stored Points of Interest.

FIG. 9 is a block diagram illustrating a number of representative locations and corresponding actions that can be associated with stored POIs. In some cases the action is defined by the mobile terminal user himself/herself, while in other cases the action is provided by an external entity. As an example of a user-defined action, the user may have heard of or eaten at a downtown 900 restaurant. When in a location near the restaurant, the user may capture the current base station ID (or other beacon signal) as a POI, and assign an action to that POI. The action may be, for example, a message 902 indicating that there is "good food at XYZ Restaurant." Other user-defined actions may also be included with that POI, such as an audible beep, etc. Another example of a user-defined action is an action assigned by the user near a time zone 904 change. When a user travels to a time zone border, a stored POI may have an associated action to provide a message 906 reminding the user to change the time on his/her watch.

The action may be provided by a party other than the mobile terminal user. For example, a retail store or mall 908 can present a message 910 to mobile terminal users at a particular location. The message 910 may be, for example, a welcome message or an offer to join a frequent buyer program for that store/mall. Alternatively or in addition to such a message, the mall 908 may provide a link 912 to the mobile terminal user. Providing links in such a manner relieves the user from having to browse in a particular location that will be visited again, as the link will automatically be presented to the user whenever the user is in that location. The mall 908 or other commercial entity may also provide a program as the action, such as a Java applet 914 or other transportable program. In this manner, the user can store both the POI and the provided Java applet, and the Java applet will be automatically launched when the user returns to the location corresponding to that POI.

Transportation services frequently used by a mobile terminal user represent another likely candidate POI storage. Such transportation services include train/bus/subway stations 916, airports 918, car rentals 920, and the like. The user may define an action with a POI associated with a train station 916 such that a message 922 is automatically presented to the user when nearing the train station 916. Another action can be linking to content provided by the train station 916 via a URL 924. The action may originally be created by the user, or by the train station. Similar actions may be used for an airport, such as linking to content provided by the airport 918 via a URL 926. An additional action may be to initiate an applet 928 available either via connection to the airport 918 web site or via local storage. Furthermore, a user may generally use a particular airline, and more precise location services such as Bluetooth may be used to obtain information specific to that airline. In such a case, when the user nears a Bluetooth access point associated with that airline, a Bluetooth connection 930 may be initiated. Similar actions may be used for car rental companies 920, where messages and/or applications 932 may be the associated action. The above examples are merely representative of the wide variety of locations and corresponding actions that may be implemented, and it will be readily apparent to those skilled in the art from the foregoing description that many other 934 locations and actions are within the scope of the present invention.

It should also be recognized that the defined "action" may be to take no action at all, i.e., a null action. This may be the case where, for example, the user re-defines an action as a null action to temporarily disable the original action, while keeping it available in the action list. As another example, the user may store a point of interest, but has not yet assigned an action to that point of interest, and a null action may be assigned by default until the user changes the action to something more meaningful.

Figure 10:
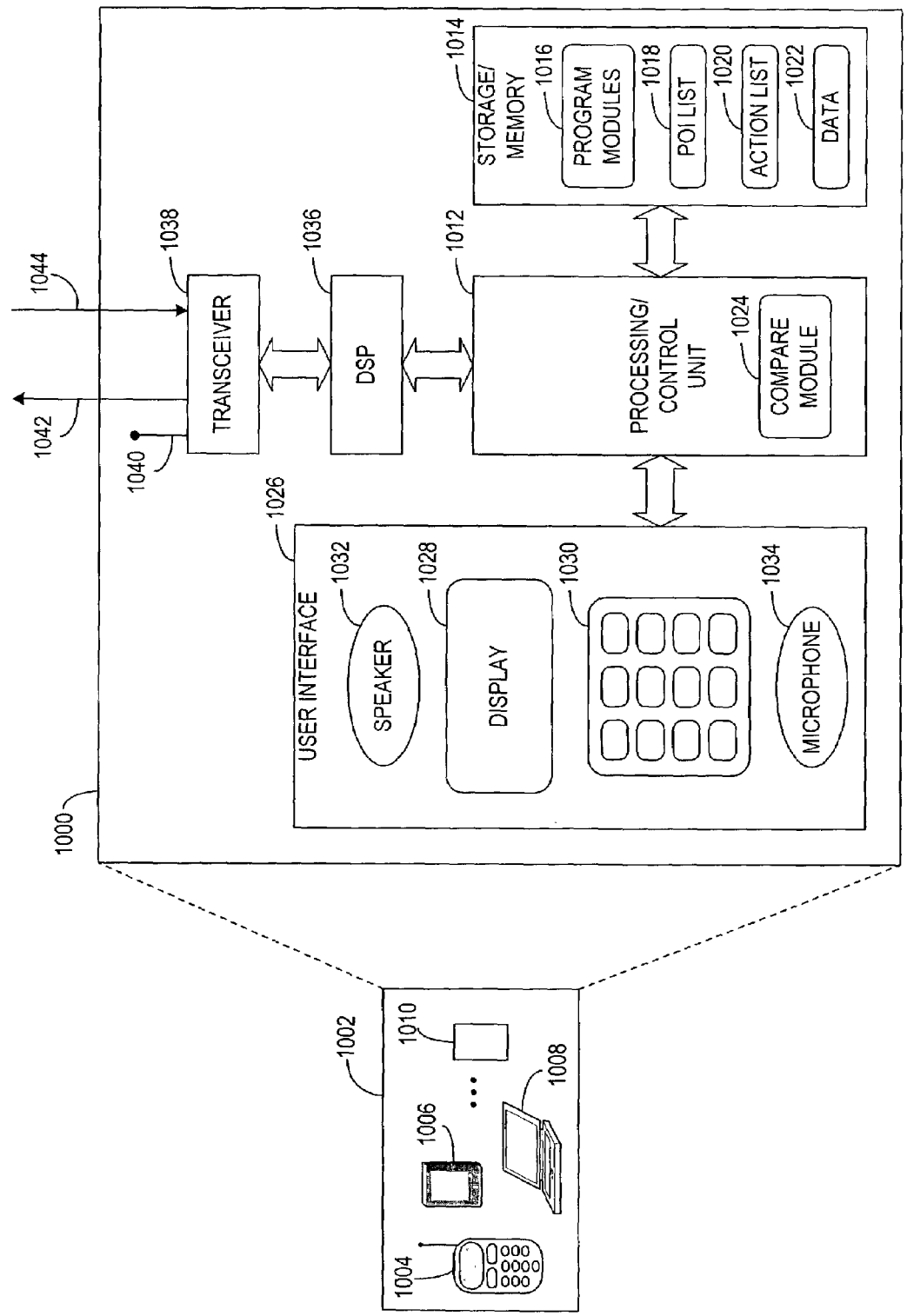
FIG. 10 illustrates a representative mobile terminal computing system capable of carrying out operations in accordance with the invention.

The mobile terminals described in connection with the present invention may be any number of wireless devices, such as wireless/cellular telephones, personal digital assistants (PDAs), or other wireless handsets, as well as portable computing devices capable of wireless communication. The mobile terminals utilize computing systems to control and manage the conventional device activity as well as the functionality provided by the present invention. Hardware, firmware, software or a combination thereof may be used to perform the various location-aware application triggering functions, display presentations, and operations described herein. An example of a representative mobile terminal computing system capable of carrying out operations in accordance with the invention is illustrated in FIG. 10.

The exemplary mobile computing arrangement 1000 suitable for performing the profile agent activity in accordance with the present invention may be associated with a number of different types of wireless devices. For purposes of illustration, the wireless device 1002 may represent any of a number of mobile communication devices, such as a cellular telephone 1004, a personal digital assistant (PDA) 1006, a notebook or laptop computer 1008, or any other type of terminal represented by device 1010. The representative mobile computing arrangement 1000 includes a processing/control unit 1012, such as a microprocessor, reduced instruction set computer (RISC), or other central processing module. The processing unit 1012 need not be a single device, and may include one or more processors. For example, the processing unit may include a master processor and associated slave processors coupled to communicate with the master processor.

The processing unit 1012 controls the basic functions of the mobile terminal as dictated by programs available in the program storage/memory. Thus, the processing unit 1012 executes the functions associated with the context/location-aware application triggering of the present invention. More particularly, the program storage/memory 1014 may include an operating system and program modules 1016 for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The relevant software for carrying out conventional mobile terminal operations and operations in accordance with the present invention may also be transmitted to the mobile computing arrangement 1000 via data signals, such as being downloaded electronically via one or more networks, such as the Internet and an intermediate wireless network(s).

The program storage/memory 1014 also stores the POI list 1018 and the action list 1020 as described above. The storage/memory 1014 may also store data 1022, such as the various stored messages, applets, addresses, etc. that serve as the actions corresponding to stored POIs. In one embodiment of the invention, at least the POI list 1018, action list 1020, and data 1022 are stored in non-volatile electrically-erasable, programmable ROM (EEPROM), flash ROM, etc. so that the information is not lost upon power down of the mobile terminal.

The processor 1012, under the direction of one or more program modules 1016, performs functions associated with the context/location-aware application triggering of the present invention. For example, the processor 1012 compares current location identifiers (e.g., base station identifiers) with the stored POIs in the POI list 1018 using a compare module 1024. While such a compare function can alternatively be performed using hardware, the compare function is performed using the processor 1012 in the illustrated embodiment.

The processor 1012 is also coupled to user-interface 1026 elements associated with the mobile terminal. The user-interface 1026 of the mobile terminal may include, for example, a display 1028 such as a liquid crystal display, a keypad 1030, speaker 1032, and microphone 1034. These and other user-interface components are coupled to the processor 1012 as is known in the art. The keypad 1030 includes alpha-numeric keys for performing a variety of functions, including dialing numbers and executing operations assigned to one or more keys. For example, in accordance with the present invention, the correlation between stored POIs and desired actions may be created, maintained, modified, etc. by using the keypad 1030. Further, the keypad 1030 or other user-interface mechanism allows the mobile terminal user to "tag" and store particular identifiers as points of interest. For example, a message may be presented on the display 1028 asking the mobile terminal user whether the identifier would like to be stored as a point of interest. Via the keyboard 1030, the mobile terminal user may choose to store the identifier as a point of interest. Other user-interface mechanisms may be employed, such as voice commands, switches, touch pad/screen, graphical user interface using a pointing device, trackball, joystick, or any other user interface mechanism. The keypad 1030 will be different depending on the type of mobile terminal 1002 utilized.

The mobile computing arrangement 1000 may also include a digital signal processor (DSP) 1036. A DSP 1036 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1038, generally coupled to an antenna 1040, transmits the outgoing radio signals 1042 and receives the incoming radio signals 1044 associated with the wireless device.

The mobile computing arrangement 1000 of FIG. 10 is provided as a representative example of a computing environment in which the principles of the present invention may be applied. From the description provided herein, those skilled in the art will appreciate that the present invention is equally applicable in a variety of other currently known and future mobile computing environments. For example, the POI and action lists, data, compare functions, etc. in accordance with the present invention may be stored in a variety of manners, may be operable on a variety of processing devices, and may be operable in mobile devices having additional, fewer, or different supporting circuitry and user-interface mechanisms.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, while certain aspects of the present invention are described in terms of a GSM environment, it should be recognized that the principles of the present invention may be applied in other cellular network environments, such as PCS, CDMA, etc. It is intended that the scope of the invention be limited not with this detailed description, but rather by the claims appended hereto.

What is claimed is:

1. A method for automatically initiating at least one action on a wireless device, comprising:
   receiving one or more wireless service area identifiers at the wireless device;
   user-initiated storing of one or more of the received wireless service area identifiers as points of interest on the wireless device;
   facilitating user-directed association of actions with one or more of the stored points of interest;
   receiving a wireless service area identifier corresponding to a particular one of the stored points of interest when the wireless device enters a wireless service area corresponding to the particular one of the stored points of interest; and
   invoking the action associated with the particular one of the stored points of interest when the wireless device enters the wireless service area corresponding to the particular one of the stored points of interest and receives the wireless service area identifier corresponding to the particular one of the stored points of interest.

2. The method as in claim 1, further comprising comparing the wireless service area identifier of the entered wireless service area with the stored points of interest to determine whether the wireless service area identifier corresponds to the particular one of the stored points of interest.

3. The method as in claim 1, further comprising invoking additional actions associated with respective ones of the stored points of interest each time the wireless device enters a wireless service area corresponding to one of the stored points of interest.

4. The method as in claim 1, wherein receiving one or more wireless service area identifiers comprises receiving one or more base station identifiers in a cellular network.

5. The method as in claim 4, wherein the base station identifiers comprise a cell identifier which uniquely identifies the wireless service area with respect to other cells in a surrounding area.

6. The method as in claim 4, wherein the cellular network is a GSM cellular network, and wherein the base station identifiers comprise at least one of a cell identifier (cell-ID) and a Base station Color Code (BCC).

7. The method as in claim 4, wherein receiving one or more base station identifiers comprises receiving, from the base station, the base station identifier of the wireless service area in which the wireless device is currently within.

8. The method as in claim 7, wherein storing one or more of the received wireless service area identifiers as points of interest on the wireless device comprises storing the base station identifier of the wireless service area in which the wireless device is currently within as a point of interest.

9. The method as in claim 4, wherein receiving one or more base station identifiers comprises receiving, from the base station, a plurality of base station identifiers of the wireless service areas associated with the base station in which the wireless device is currently within and at least one base station proximate to the base station in which the wireless device is currently within.

10. The method as in claim 9, wherein receiving the plurality of base station identifiers comprises receiving, from the base station, the base station identifiers within a paging area for mobile-based or mobile-assisted handovers.

11. The method as in claim 10, wherein storing one or more of the received wireless service area identifiers as points of interest on the wireless device comprises storing one or more of the plurality of base station identifiers provided by the base station as part of the paging area for mobile-based or mobile-assisted handovers.

12. The method as in claim 4, wherein receiving one or more base station identifiers comprises receiving a radio fingerprint comprising a plurality of base station identifiers from a plurality of overlapping wireless service areas concurrently perceived at the wireless device.

13. The method as in claim 12, wherein storing one or more of the received wireless service area identifiers as points of interest on the wireless device comprises storing one or more of the base station identifiers associated with the radio fingerprint based at least in part on a signal strength of the respective base station identifiers.

14. The method as in claim 1, wherein receiving one or more wireless service area identifiers comprises receiving one or more base station identifiers associated with a cellular network from a third party including at least one of an entity and another mobile terminal user.

15. The method as in claim 1, wherein receiving one or more wireless service area identifiers comprises receiving one or more beacon signals including beacon identifiers from a wireless communication system.

16. The method as in claim 15, wherein the wireless communication system is a Bluetooth communication system, and wherein receiving one or more wireless service area identifiers comprises receiving the beacon identifiers from a Bluetooth access point serving the wireless service area.

17. The method as in claim 15, wherein the wireless communication system is a Wireless Local Area Network (WLAN), and wherein receiving one or more wireless service area identifiers comprises receiving the beacon identifiers from a WLAN access point serving the wireless service area.

18. The method as in claim 1, wherein storing one or more of the received wireless service identifiers comprises storing the received wireless service identifiers in a point of interest list in a wireless device memory.

19. The method as in claim 1, wherein the association of actions with one or more of the stored points of interest comprises storing an action list in a wireless device memory, wherein the action list includes one or more entries each correlating at least one action with each of the stored points of interest.

20. The method as in claim 19, wherein invoking the action associated with a particular one of the stored points of interest comprises locating the stored point of interest in an entry of the action list and invoking the action correlated to that point of interest.

21. The method as in claim 1, further comprising receiving the wireless service area identifier corresponding to the particular one of the stored points of interest when the wireless device enters the wireless service area corresponding to the particular one of the stored points of interest, and wherein invoking the action associated with a particular one of the stored points of interest comprises invoking the action when the wireless device enters the wireless service area and receives the wireless service area identifier.

22. The method as in claim 1, wherein invoking the action comprises presenting textual or graphical message on a display of the wireless device.

23. The method as in claim 1, wherein invoking the action comprises presenting an audible message via a speaker of the wireless device.

24. The method as in claim 1, wherein invoking the action comprises initiating a local browser application and accessing at least one of programs and information via a predetermined site identified by a network address stored at the wireless device.

25. The method as in claim 1, wherein invoking the action comprises initiating a program locally stored on the wireless device.

26. The method as in claim 1, wherein invoking the action comprises initiating a connection to a secondary wireless service.

27. The method as in claim 1, further comprising defining one or more personal parameters and at least one action mode based at least in part on the personal parameters, and wherein invoking the action associated with a particular one of the stored points of interest comprises invoking the action associated with a particular one of the stored points of interest and associated with a currently selected action mode.

28. A mobile terminal operable in a wireless network, comprising:
  a memory comprising a user-identified point of interest list, and an action list correlating one or more actions with each point of interest in the point of interest list;
  a processor coupled to the memory to store wireless service area identifiers received at the mobile terminal as the points of interest in the point of interest list when the mobile terminal enters a wireless service area corresponding to each point of interest, wherein the processor is configured to invoke an action pre-assigned by a user of the mobile terminal via the action list to a particular one of the points of interest when the mobile terminal is within a wireless service area corresponding to the particular stored point of interest and receives a wireless service area identifier corresponding to the particular one of the points of interest; and
  a user interface for presenting the invoked action to the user of the mobile terminal.

29. The mobile terminal as in claim 28, wherein the processor is further configured to compare a newly received wireless service area identifier with the point of interest list, and to invoke the action pre-assigned via the action list to a matching point of interest in the point of interest list.

30. The mobile terminal as in claim 29, wherein newly received wireless service area identifiers are received upon entry of the mobile terminal new wireless service areas.

31. The mobile terminal as in claim 28, wherein the processor is coupled to the memory to further store correlations of the stored points of interest and pre-assigned actions into the action list.

32. The mobile terminal as in claim 28, wherein the user interface comprises means for designating particular ones of the wireless service area identifiers to store in the point of interest list.

33. The mobile terminal as in claim 28, wherein the user interface comprises means for associating points of interest with one or more actions.

34. The mobile terminal as in claim 28, wherein the user interface further comprises a display to present visual information on the mobile terminal in response to invoking the action.

35. The mobile terminal as in claim 28, wherein the user interface further comprises a speaker to present audio information via the mobile terminal in response to invoking the action.

36. The mobile terminal as in claim 28, further comprising a receiver to receive the wireless service area identifiers.

37. The mobile terminal as in claim 28, wherein the action list serves as both the point of interest list and the action list.

38. A system for facilitating automatic initiation of actions on mobile terminals, comprising:
  a cellular network having a plurality of cells each substantially defined by a wireless transmission range of a corresponding base station, wherein each of the cells is identifiable by a cell identifier (cell-ID) that is transmitted via its respective base station;
  at least one mobile terminal operable in the cellular network and capable of performing mobile-assisted handovers, the mobile terminal comprising:
  (a) a memory comprising:
    (1) a point of interest list;
    (2) an action list correlating one or more actions with each point of interest in the point of interest list;
    (3) a list of cell-IDs provided by a base station of the cell in which the mobile terminal is physically located, wherein the list of cell-IDs corresponds to a plurality of candidate channels for mobile-assisted handovers supplied by the base station; and
  (b) a processor coupled to the memory to store one or more cell-IDs, selected from the list of cell-IDs, as the points of interest in the point of interest list, wherein the processor is configured to invoke an action pre-assigned via the action list to a particular one of the points of interest when the mobile terminal is within a cell corresponding to the particular stored point of interest.

39. The system of claim 38, wherein the cellular network comprises a GSM network.

40. The system of claim 38, wherein mobile-assisted handovers comprises mobile-based handovers.

41. A mobile terminal operable in a wireless network, comprising:
  means for receiving one or more wireless service area identifiers at the mobile terminal;
  means for user-initiated storing on the mobile terminal at least one of the received wireless service area identifiers as a point of interest;
  the receiving means comprising means for receiving the at least one of the wireless service area identifiers corresponding to the point of interest when the mobile terminal enters a wireless service area corresponding to the point of interest;
  means for facilitating user-correlation of at least one action with the point of interest; and
  means for invoking the action correlated with the point of interest, when the mobile terminal is located in a the wireless service area corresponding to the point of interest and receives the at least one of the wireless service area identifiers.

42. A computer-readable medium having instructions stored thereon and executable by a computing arrangement in a wireless device for facilitating automatic initiation of actions on the wireless device by performing steps comprising:
  receiving one or more wireless service area identifiers at the wireless device;
  user-initiated storing of one or more of the received wireless service area identifiers as points of interest on the wireless device;
  user-facilitated associating of actions with one or more of the stored points of interest;
  receiving a wireless service area identifier corresponding to a particular one of the stored points of interest when the wireless device enters a wireless service area corresponding to the particular one of the stored points of interest; and
  invoking the action associated with the particular one of the stored points of interest when the wireless device enters the wireless service area corresponding to the particular one of the stored points of interest and receives the wireless service area identifier corresponding to the particular one of the stored points of interest.

43. A computer-readable medium having instructions stored thereon which are executable by a computing module for automatically initiating actions on an associated mobile terminal capable of performing mobile-assisted handovers, the executable instructions performing steps comprising:
  storing a point of interest list;
  providing an action list correlating one or more actions with each point of interest in the point of interest list;
  storing a list of cell identifiers (cell IDs) provided via a base station of a cellular network corresponding to a cell in which the mobile terminal is physically located, wherein the list of cell-IDs corresponds to a plurality of candidate channels for mobile-assisted handovers supplied by the base station;
  storing one or more cell-IDs, selected from the list of cell-IDs, as the points of interest in the point of interest list; and
  invoking an action pre-assigned via the action list to a particular one of the points of interest when the mobile terminal is within a cell corresponding to the particular stored point of interest.

44. A mobile terminal capable of performing mobile-assisted handovers in a cellular network having a plurality of cells each substantially defined by a wireless transmission range of a corresponding base station, wherein each of the cells is identifiable by a cell identifier (cell-ID) that is transmitted via its respective base station, the mobile terminal comprising:
  a memory comprising a point of interest list, an action list correlating one or more actions with each point of interest in the point of interest list, and a list of cell-IDs provided by a base station of the cell in which the mobile terminal is physically located, wherein the list of cell-IDs corresponds to a plurality of candidate channels for mobile-assisted handovers supplied by the base station; and a processor coupled to the memory to store one or more cell-IDs, selected from the list of cell-IDs, as the points of interest in the point of interest list, wherein the processor is configured to invoke an action pre-assigned via the action list to a particular one of the points of interest when the mobile terminal is within a cell corresponding to the particular stored point of interest.

* * * * *

US007096030C1

(12) EX PARTE REEXAMINATION CERTIFICATE (10179th)
United States Patent
Huomo

(10) Number: US 7,096,030 C1
(45) Certificate Issued: May 30, 2014

(54) SYSTEM AND METHOD FOR INITIATING LOCATION-DEPENDENT APPLICATIONS ON MOBILE DEVICES

(75) Inventor: Heikki Huomo, Espoo (FI)

(73) Assignee: Nokia Corporation, Espoo (FI)

Reexamination Request:
No. 90/012,963, Aug. 29, 2013

Reexamination Certificate for:
Patent No.: 7,096,030
Issued: Aug. 22, 2006
Appl. No.: 10/186,243
Filed: Jun. 28, 2002

(51) Int. Cl.
*H04Q 7/20* (2006.01)

(52) U.S. Cl.
USPC .................. 455/456.3; 455/412.1; 455/414.2; 455/550.1

(58) Field of Classification Search
None
See application file for complete search history.

(56) References Cited

To view the complete listing of prior art documents cited during the proceeding for Reexamination Control Number 90/012,963, please refer to the USPTO's public Patent Application Information Retrieval (PAIR) system under the Display References tab.

*Primary Examiner* — Minh Dieu Nguyen

(57) ABSTRACT

A system, apparatus, and method for facilitating location-based triggering of actions, applications, services, and the like on wireless devices, for locations that may be subsequently visited by the mobile device user. Wireless service area identifiers are received at the wireless device, where selected ones can be stored as points of interest on the wireless device. Actions are correlated with the stored points of interest, where this correlation is also stored on the wireless device. An action associated with a particular stored point of interest is invoked when the wireless device enters a wireless service area corresponding to the particular stored point of interest.

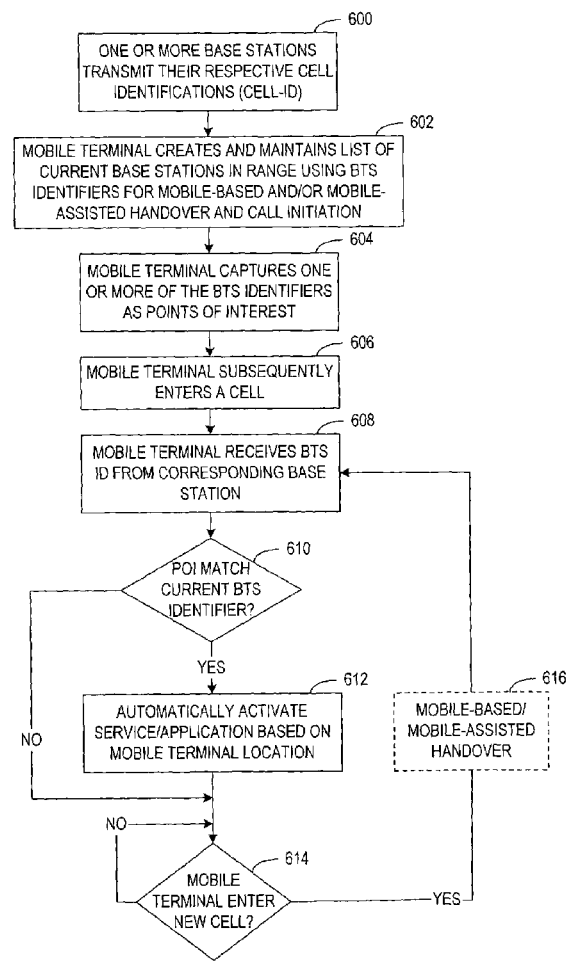

US 7,096,030 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 28, 38 and 41-44 are determined to be patentable as amended.

Claims 2-13, 15-27, 29-37, 39 and 40, dependent on an amended claim, are determined to be patentable.

Claim 14 was not reexamined.

1. A method for automatically initiating at least one action on a wireless device, comprising:
  receiving one or more wireless service area identifiers at the wireless device;
  user-initiated storing of one or more of the received wireless service area identifiers as points of interest on the wireless device;
  facilitating user-directed association of actions with one or more of the stored points of interest, *wherein the actions comprise providing with the wireless device content related to the associated one or more stored points of interest*;
  receiving a wireless service area identifier corresponding to a particular one of the stored points of interest when the wireless device enters a wireless service area corresponding to the particular one of the stored points of interest; and
  invoking the action associated with the particular one of the stored points of interest when the wireless device enters the wireless service area corresponding to the particular one of the stored points of interest and receives the wireless service area identifier corresponding to the particular one of the stored points of interest.

28. A mobile terminal operable in a wireless network, comprising:
  a memory comprising a user-identified point of interest list, and an action list correlating one or more actions with each point of interest in the point of interest list, *wherein the one or more actions comprise providing with the mobile terminal content related to the respective correlated point of interest*;
  a processor coupled to the memory to store wireless service area identifiers received at the mobile terminal as the points of interest in the point of interest list when the mobile terminal enters a wireless service area corresponding to each point of interest, wherein the processor is configured to invoke an action pre-assigned by a user of the mobile terminal via the action list to a particular one of the points of interest when the mobile terminal is within a wireless service area corresponding to the particular stored point of interest and receives a wireless service area identifier corresponding to the particular one of the points of interest; and
  a user interface for presenting the invoked action to the user of the mobile terminal.

38. A system for facilitating automatic initiation of actions on mobile terminals, comprising:
  a cellular network having a plurality of cells each substantially defined by a wireless transmission range of a corresponding base station, wherein each of the cells is identifiable by a cell identifier (cell-ID) that is transmitted via its respective base station;
  at least one mobile terminal operable in the cellular network and capable of performing mobile-assisted handovers, the mobile terminal comprising:
    (a) a memory comprising:
      (1) a point of interest list;
      (2) an action list correlating one or more actions with each point of interest in the point of interest list, *wherein the one or more actions comprise providing with the mobile terminal content related to the respective, correlated point of interest*;
      (3) a list of cell-IDs provided by a base station of the cell in which the mobile terminal is physically located, wherein the list of cell-IDs corresponds to a plurality of candidate channels for mobile-assisted handovers supplied by the base station; and
    (b) a processor coupled to the memory to store one or more cell-IDs, selected from the list of cell-IDs, as the points of interest in the point of interest list, wherein the processor is configured to invoke an action pre-assigned via the action list to a particular one of the points of interest when the mobile terminal is within a cell corresponding to the particular stored point of interest.

41. A mobile terminal operable in a wireless network, comprising:
  means for receiving one or more wireless service area identifiers at the mobile terminal;
  means for user-initiated storing on the mobile terminal at least one of the received wireless service area identifiers as a point of interest;
  the receiving means comprising means for receiving the at least one of the wireless service area identifiers corresponding to the point of interest when the mobile terminal enters a wireless service area corresponding to the point of interest;
  means for facilitating user-correlation of at least one action with the point of interest, *wherein the at least one action comprises providing with the mobile terminal content related to the correlated stored point of interest*; and
  means for invoking the action correlated with the point of interest, when the mobile terminal is located in [a] the wireless service area corresponding to the point of interest and receives the at least one of the wireless service area identifiers.

42. A computer-readable medium having instructions stored thereon and executable by a computing arrangement in a wireless device for facilitating automatic initiation of actions on the wireless device by performing steps comprising:
  receiving one or more wireless service area identifiers at the wireless device;
  user-initiated storing of one or more of the received wireless service area identifiers as points of interest on the wireless device;
  user-facilitated associating of actions with one or more of the stored points of interest, *wherein the actions comprise providing with the wireless device content related to the associated one or more stored points of interest*;
  receiving a wireless service area identifier corresponding to a particular one of the stored points of interest when the wireless device enters a wireless service area corresponding to the particular one of the stored points of interest; and invoking the action associated with the particular one of the stored points of interest when the wireless device enters the wireless service area corresponding to the particular one of the stored points of interest and receives the wireless service area identifier corresponding to the particular one of the stored points of interest.

43. A computer-readable medium having instructions stored thereon which are executable by a computing module for automatically initiating actions on an associated mobile terminal capable of performing mobile-assisted handovers, the executable instructions performing steps comprising:

storing a point of interest list;

providing an action list correlating one or more actions with each point of interest in the point of interest list, *wherein at least one of the one or more actions comprises providing with the mobile terminal content related to the respective, correlated point of interest*;

storing a list of cell identifiers (cell IDs) provided via a base station of a cellular network corresponding to a cell in which the mobile terminal is physically located, wherein the list of cell-IDs corresponds to a plurality of candidate channels for mobile-assisted handovers supplied by the base station;

storing one or more cell-IDs, selected from the list of cell-IDs, as the points of interest in the point of interest list; and invoking an action pre-assigned via the action list to a particular one of the points of interest when the mobile terminal is within a cell corresponding to the particular stored point of interest.

44. A mobile terminal capable of performing mobile-assisted handovers in a cellular network having a plurality of cells each substantially defined by a wireless transmission range of a corresponding base station, wherein each of the cells is identifiable by a cell identifier (cell-ID) that is transmitted via its respective base station, the mobile terminal comprising:

a memory comprising a point of interest list, an action list correlating one or more actions with each point of interest in the point of interest list, *wherein the one or more actions comprise providing with the mobile terminal content related to the respective correlated point of interest*, and a list of cell-IDs provided by a base station of the cell in which the mobile terminal is physically located, wherein the list of cell-IDs corresponds to a plurality of candidate channels for mobile-assisted handovers supplied by the base station; and a processor coupled to the memory to store one or more cell-IDs, selected from the list of cell-IDs, as the points of interest in the point of interest list, wherein the processor is configured to invoke an action pre-assigned via the action list to a particular one of the points of interest when the mobile terminal is within a cell corresponding to the particular stored point of interest.

\* \* \* \* \*